June 6, 1944. W. R. SPILLER ET AL 2,350,540
CUTTING MACHINE
Filed Nov. 2, 1942 7 Sheets-Sheet 1

INVENTORS
William R. Spiller and
BY Leo D. Barley
Marshal & Noe
ATTORNEYS

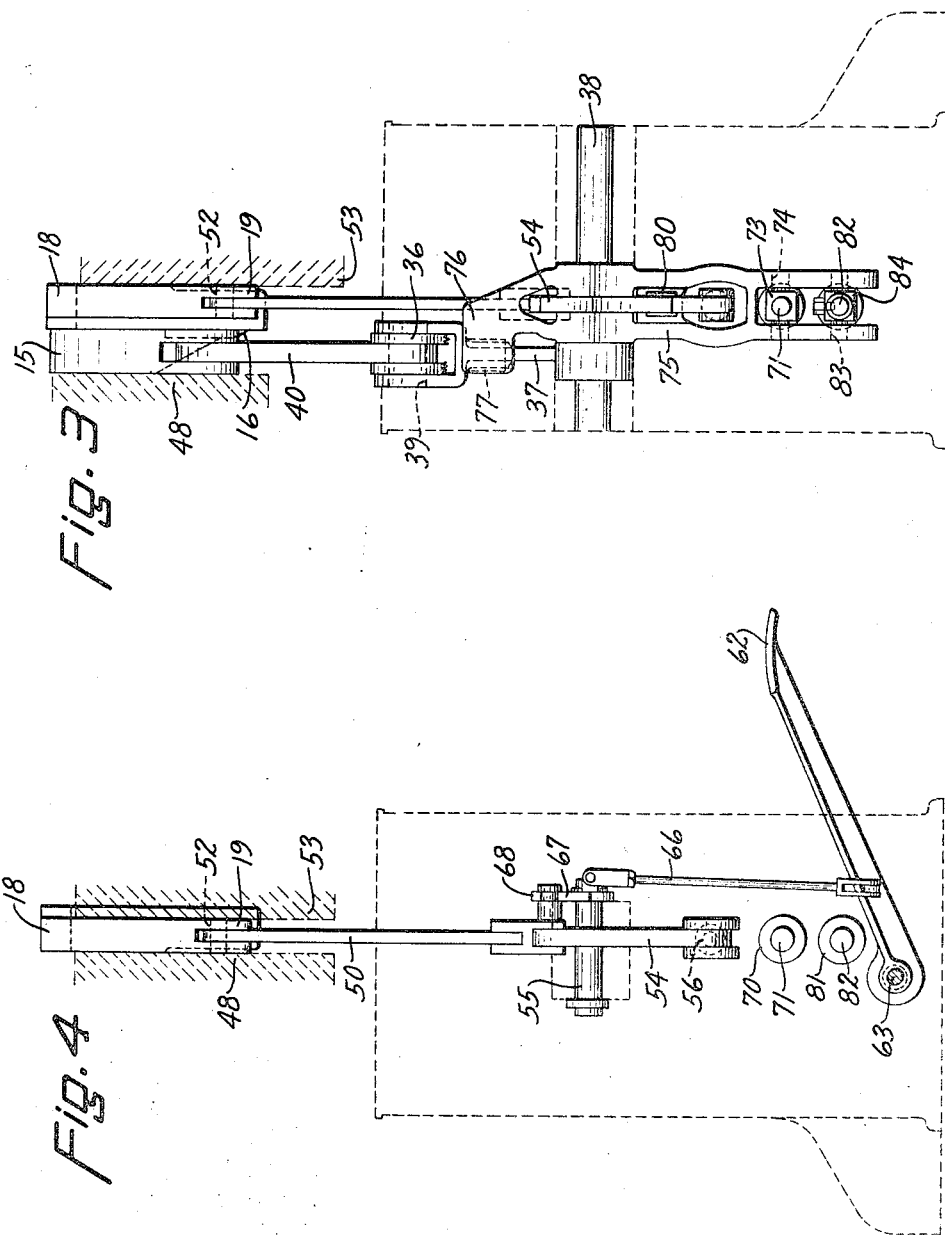

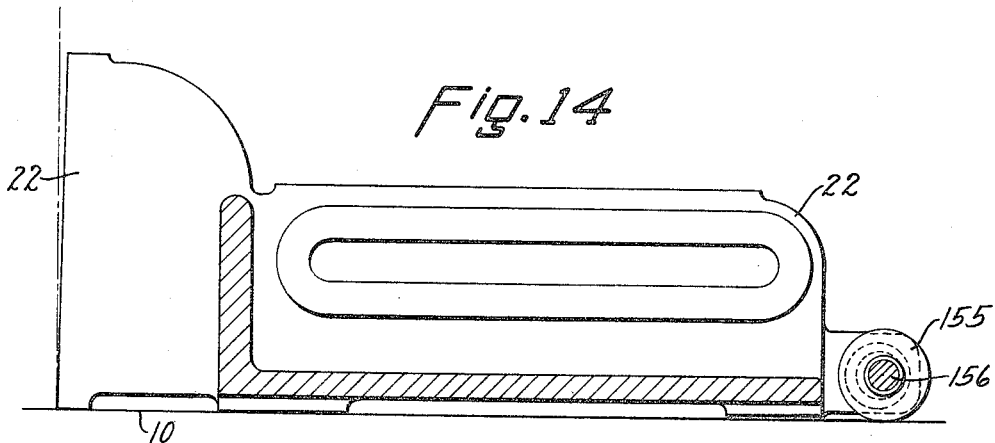
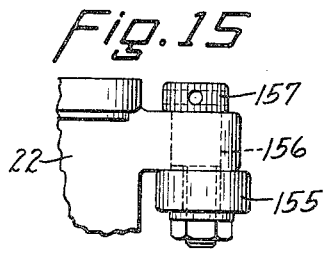
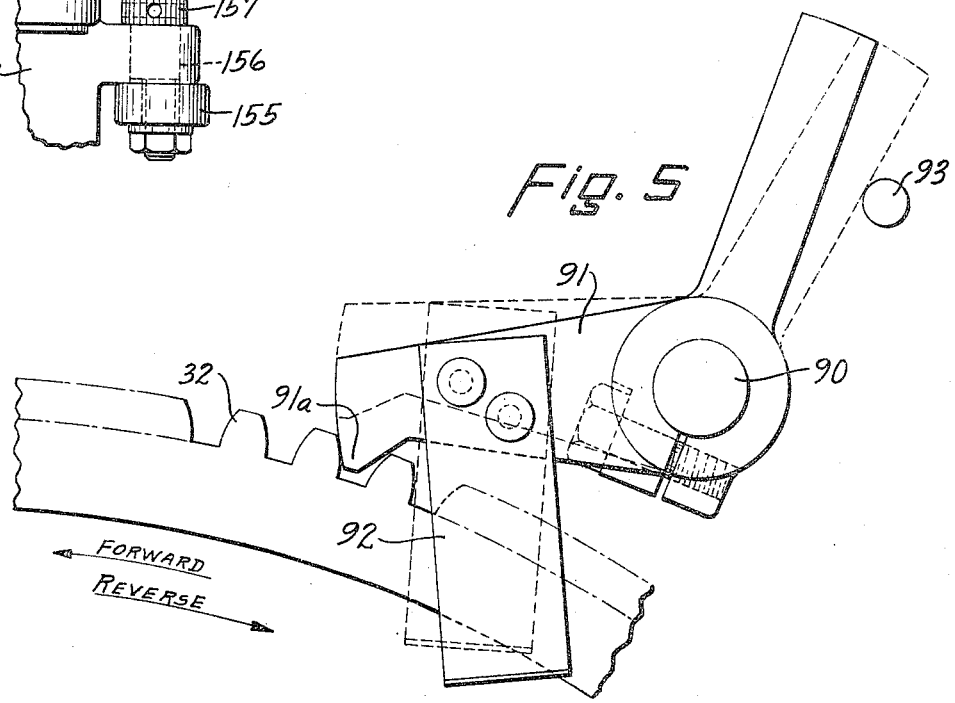

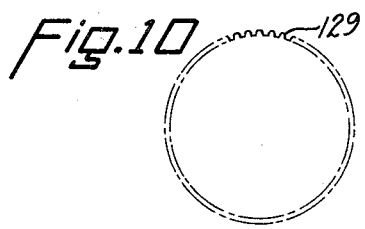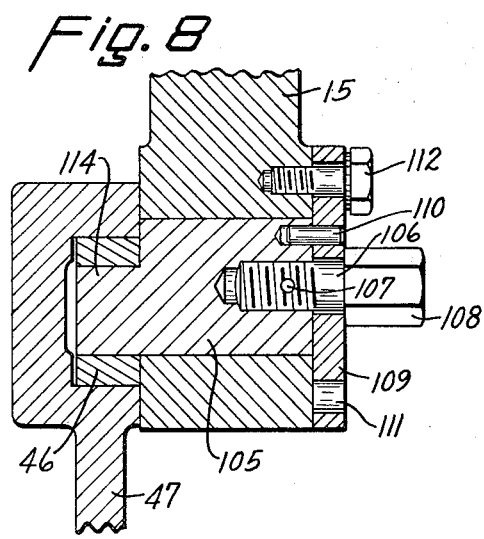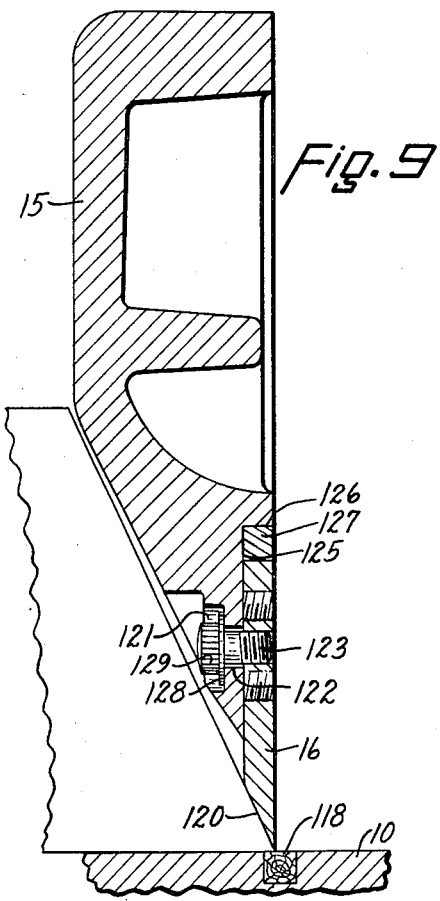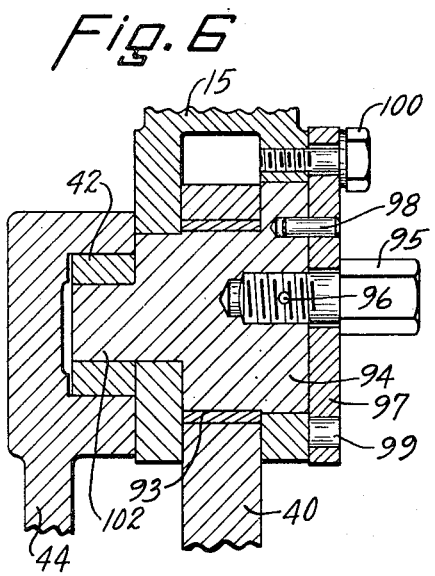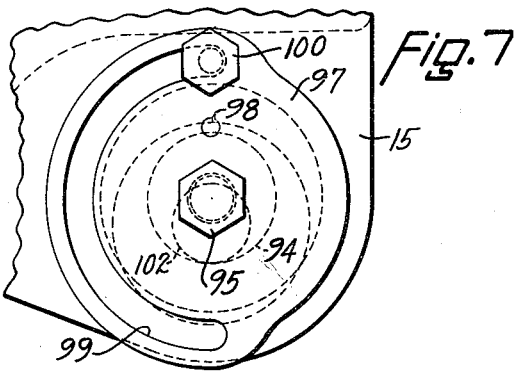

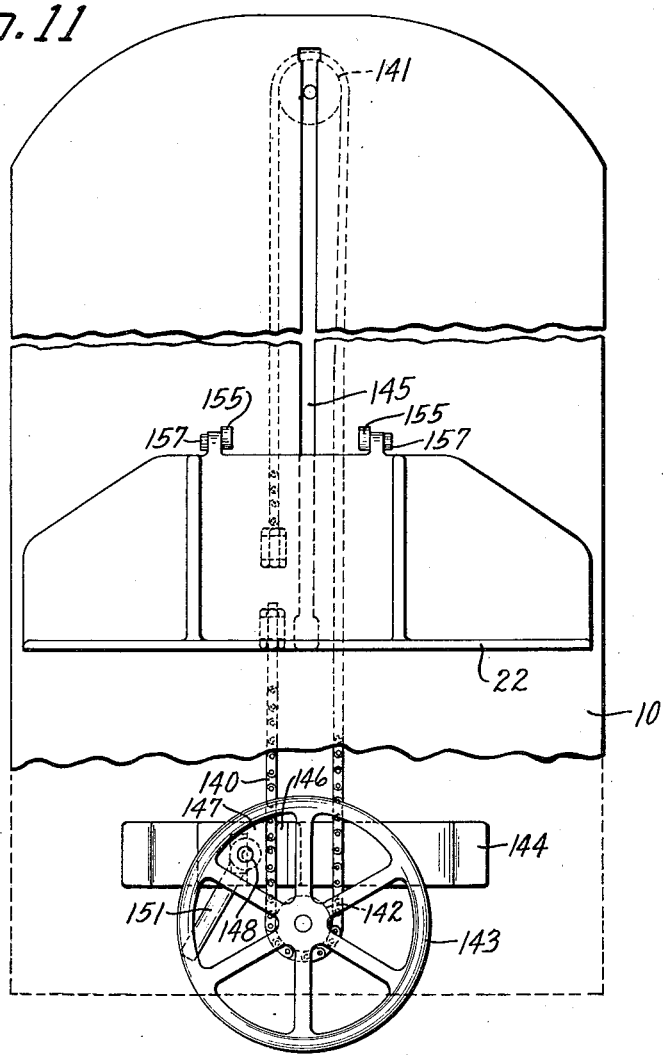

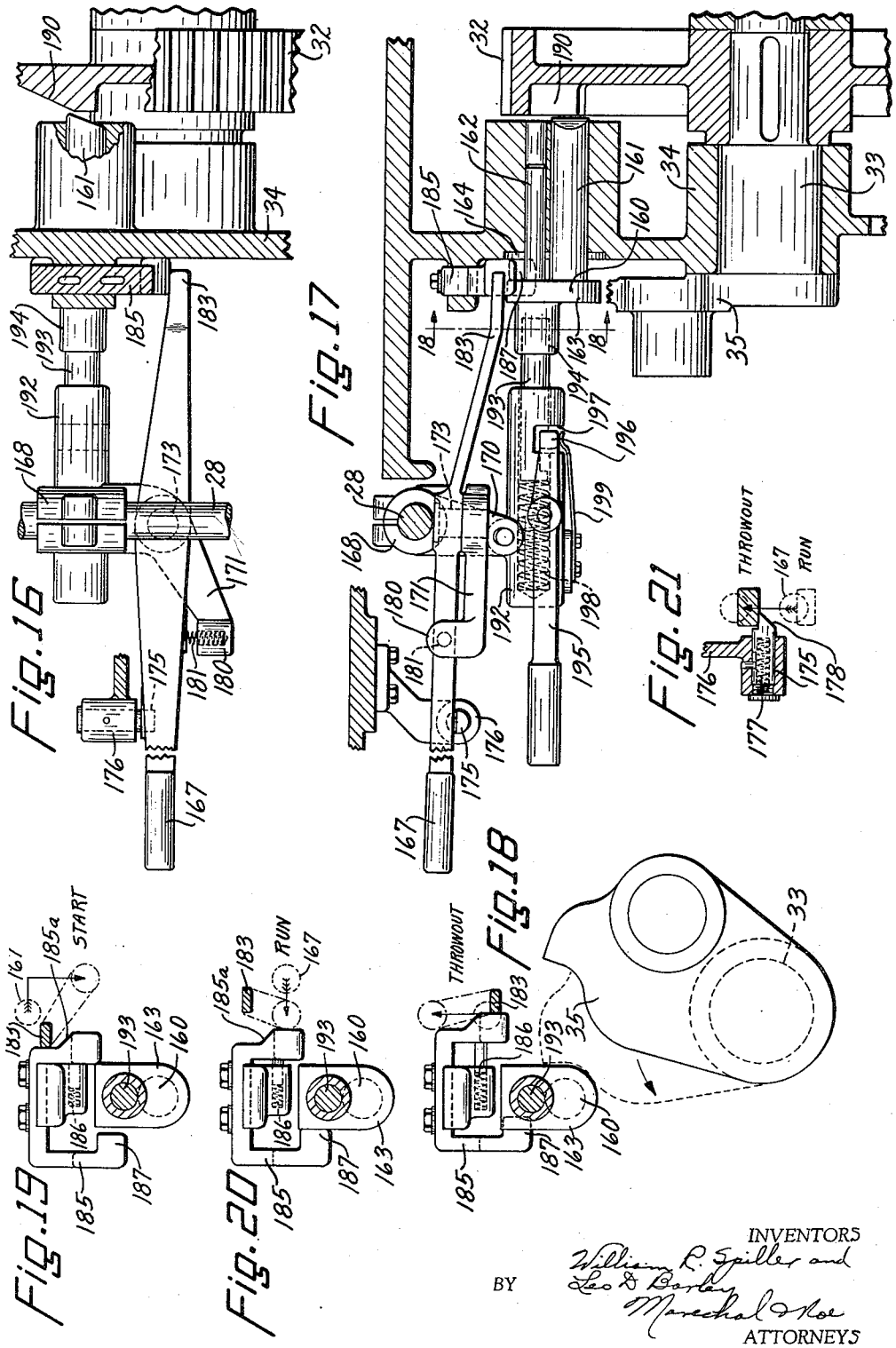

Patented June 6, 1944

2,350,540

UNITED STATES PATENT OFFICE 2,350,540

CUTTING MACHINE

William R. Spiller and Leo D. Barley, Dayton, Ohio, assignors to Harris-Seybold-Potter Company, Cleveland, Ohio, a corporation of Delaware Application November 2, 1942, Serial No. 464,216

18 Claims. (Cl. 164—54)

This invention relates to cutting machines and more particularly to machines for cutting sheets of paper material and the like.

It is the principal object of the invention to provide a machine for cutting a pile of sheet material such as sheets of paper, which is adequately protected against injury to the operator as well as against damage to the machine itself and which in operation is rapid, accurate and produces sharply cut straight edges without injuring or defacing the pile of sheet material.

It is a further object to provide for holding the sheet material with a predetermined and readily adjustable pressure so that no undesired movement of the pile may occur during the cutting operation.

It is also an object to so mount the knife that it is readily removable for sharpening and the like and is easily adjustable to provide for maintaining the same in proper angular positioning and in proper spacing above the cutting table for its performance of the cutting operation.

It is a further object to provide a readily adjustable gage for determining the depth of the material to be cut which is easily adjustable and securely held against movement from a predetermined position and which likewise can be readily adjusted to provide a desired angle of tilt.

It is a still further object to provide a safety control mechanism necessitating a definite and predetermined sequence of control movements preparatory to placing the machine in operation thus assuring the operator against accidental or unintentional operation of the machine.

Other objects and advantages will be apparent from the following description, the accompanying drawing and the appended claims.

In the drawings,

Fig. 3 is an end elevational view from the right-hand end of the machine showing the same mechanism as in Fig. 2;

Fig. 4 is a similar end elevational view from the left-hand end of the machine shown in Fig. 2;

Fig. 5 is a detail view on an enlarged scale showing the construction of the non-reverse mechanism;

Fig. 6 is a sectional view on the line 6—6 of Fig. 2 showing the eccentric adjustment at the connecting rod end of the knife bar;

Fig. 7 is a front elevational view of this eccentric adjustment;

Fig. 8 is a sectional view on the line 8—8 of Fig. 2 showing the eccentric construction at the opposite end of the knife bar;

Fig. 9 is a sectional view through the knife bar and knife assembly showing the manner of securing the knife in place;

Fig. 10 is a view on an enlarged scale showing the construction of the heads of the knife bolts;

Fig. 11 is a broken plan view looking down on the cutting table and the back gage showing the construction for adjusting the position of the gage;

Fig. 12 is a front elevational view of the adjustment for the back gage and for clamping the same in predetermined position;

Fig. 13 is a detail view on an enlarged scale looking down on the line 13—13 of Fig. 12 showing the manner of clamping the back gage;

Fig. 14 is a side elevational view of the back gage showing the rear supporting roller thereof;

Fig. 15 is a broken view showing the eccentric construction of the back gage roller;

Fig. 16 is a broken view showing the interlock and control mechanism for effecting engagement of the clutch and the actuation of the machine on a cutting stroke;

Fig. 17 is a broken side elevational view of the same control mechanism shown in Fig. 16;

Fig. 18 is a vertical sectional view substantially on the line 18—18 of Fig. 17 showing the detailed construction of the interlock and safety mechanism; and Figs. 19, 20 and 21 are similar detail views showing the interlocking mechanism in various positions to illustrate the interlocking function thereof.

Figure 1:
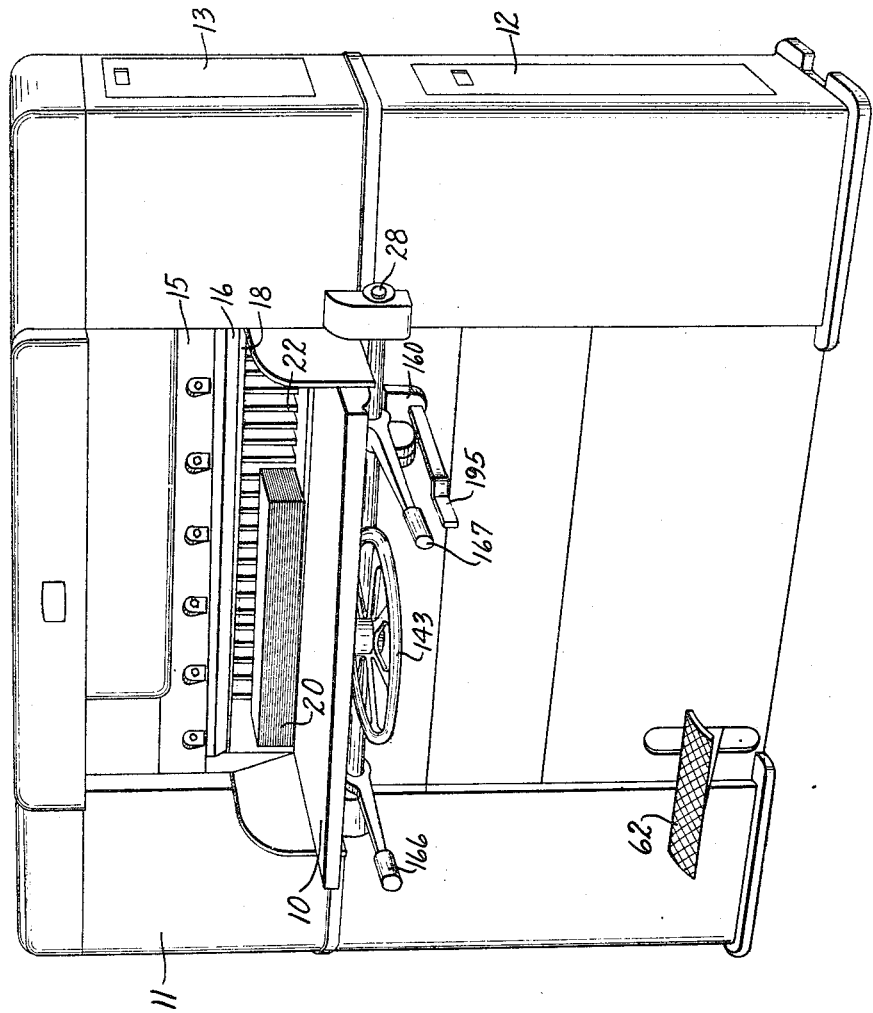
Fig. 1 is a view in perspective of the front or operator's side of a cutting machine constructed in accordance with the present invention.

Referring to the drawings which disclose a preferred emobdiment of the invention, the machine is shown in a general perspective view in Fig. 1 and as there shown is provided with an operator's position at the front or working side of the machine where the work supporting table 10 is readily accessible for the placing and removal of the work. The various control members which will be described hereinafter are likewise conveniently located for ready access and in a protected position beneath the work table. The mechanism is enclosed and protected by outer enclosing panels indicated at 11, certain of which, 12 and 13, are made removable to provide access for adjusting the various parts of the mechanism.

The knife bar is shown at 15 to which the knife 16 is secured, and extending below the lower edge of the knife in the raised position which the parts occupy in Fig. 1, is the clamping member 18. A pile of paper sheets comprising the work material is shown at 20, and is adapted to be placed on the cutting table against the back gage shown at 22 which determines the depth of sheet which will be cut by the knife.

The operating mechanism for the knife comprises a drive motor indicated at 25 which is preferably controlled by a start and stop switch but is adapted to run continuously during the time the machine is in use. It is connected directly to a clutch and brake indicated diagrammatically at 26 adapted to be controlled by a clutch lever shaft 28, the driven side of clutch being connected to pinion 27 meshing with compound gear 29 having a pinion 30, so that upon actuation of the clutch lever 28, power from the driving motor will be connected to or disconnected from the pinion.

Pinion 30 meshes with a large bull gear 32 which as shown in Fig. 17 is carried by shaft 33 which is journaled in a portion of the frame 34, this bull gear thus constituting the direct drive means for the operating mechanism. A crank arm 35 is secured to the same shaft 33 which supports the bull gear, and by means of this crank the reciprocating movement of the knife is effected.

Figure 2:
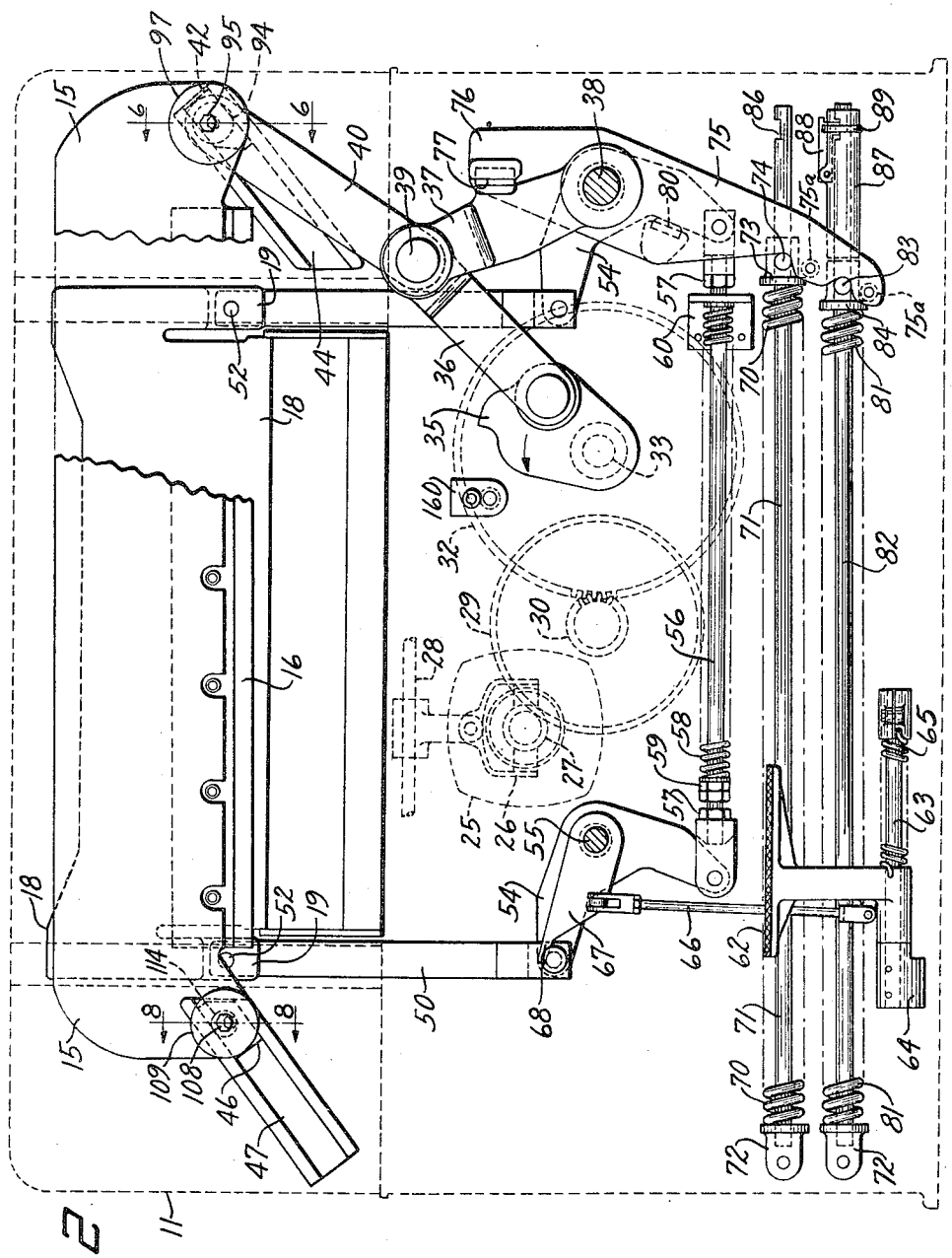
Fig. 2 is a skeleton view in front elevation of the working parts of the mechanism which produce the reciprocating movement of the knife and the operation of the clamp member.

For this purpose a pitman 36 is connected between the crank 35 and a rock arm 37 which is freely rotatably mounted upon cross pin 38, connection being through pin 39. A connecting rod 40 extends upwardly from pin 39 where it has connection with a guide block 42 carried by one end of the knife bar 15. The guide block is arranged to slide in the inclined guideway 44 which determines the path of movement of the right-hand end of the knife bar (as shown in Fig. 2).

At the opposite end of the knife bar, a second guide block 46 is similarly slidable in inclined guideway 47 to determine the position occupied by the left-hand end of the knife bar in the course of its reciprocating movement. Preferably the angles of inclination of the two guides 44 and 47 are slightly different and diverging as the knife bar moves downwardly, so that the knife is caused to assume a position parallel with the work table when it is in its lowermost position, but has the right-hand end raised slightly above the left-hand end when retracted. This provides a double shearing action, since the knife enters the work material at an angle and does not cut in direct parallelism with the sheets of work material. By reference to Fig. 3, it will also be clear that since the connecting rod 40 acts directly in the plane of the knife, the downward pull exerted thereon does not tend to produce any side thrust, and the knife accurately follows a direct vertical movement at all times. Suitable stationary guides are provided on opposite sides of the knife bar, one of which is indicated at 48, for guiding the knife bar in this desired plane of movement.

The clamp 18 as described occupies a position which is somewhat below that of the lower edge of the knife when in the upper retracted position at the end of the working stroke, and both the clamp and the knife move downwardly together at the beginning of the stroke so that the clamp comes in contact with the pile of work material before the knife reaches the same. Thereafter the clamp remains in contact with the top of the pile, exerting a predetermined desired pressure thereupon while the knife passes downwardly below the clamp, cutting through the pile of sheet material, and then returning toward its upper inoperative position. Full clamping pressure, however, is established upon the pile as soon as the clamp comes into engagement therewith, and is maintained effective throughout the entire working stroke of the knife and until the knife has passed above the upper edge of the pile on its return stroke. Pressure is only removed during the final portion of the working cycle, after the knife has again returned to a position above the clamp, so that at all times during which the knife is in contact with the pile, the desired predetermined full clamping pressure is maintained upon the pile.

In order to accomplish this, the clamp 18 is operated by means of pull bars 50 which pivot slightly on pins 52 in the yoked end portions 19 of the clamp which are guided in vertical ways 53 (Figs. 3 and 4). At their lower ends, bars 50 are attached to bell cranks 54, the left-hand crank being pivoted on a fixed pin 55 suitably carried in the frame of the machine. The right-hand crank is mounted for free rotation on shaft 38, and is spaced axially of the rock arm 37 in the manner shown in Fig. 3. At their lower ends, the bell cranks are joined by a connecting rod 56 so that they are required to move in unison with each other, thereby applying equal pressures to and establishing parallel movement of the opposite ends of the clamp, adjusting nuts 57 providing for setting the rods to so operate in unison. For the purpose of counterbalancing the weight of the clamp and to cause it to return to its upper position in the absence of power actuation thereof, a suitable spring 58 is received over the connecting rod 56 one end thereof being secured thereto by means of nuts 59, the opposite end abutting against a stationary bracket 60. Under the action of this spring, therefore, the connecting rod 56 is constrained to move toward the left, and in this direction to effect the lifting of both ends of the clamp.

In some cases it is desirable to provide for the manual operation of the clamp, irrespective of the operating cycle of the machine. For this purpose a foot operated treadle 62 is rotatably mounted upon a shaft 63 fixed in stationary supports 64, and urged toward upper position by means of a coil spring 65. The treadle is connected by means of connecting rod 66 to a finger 67 rotatably mounted on pin 55, and having a nose part 68 which overlies the lower end of the left-hand pull bar 50, in position to apply pressure thereto when the treadle is depressed, to thereby overcome the action of spring 58, and to drop the clamp downwardly upon the work material.

In order to provide a force for pressing the clamp downwardly upon the top of the pile, and for retaining such force throughout the major part of the working stroke of the machine, a compressible or resilient means is provided in which energy may be stored at a point in the working cycle which will not place an excessive load upon the driving elements, and be available for retaining the clamp in desired clamping position. In accordance with the invention this compressible means is preferably one or more compression springs which are compressed toward the end of the working stroke of the machine, and at a time when the working load is at a minimum.

In this way the application of additional load on the drive during the time that the knife is passing through the work material is avoided, while at the same time a clamping pressure is developed and made available which reaches its full desired value before the cutting operation begins, and is maintained at that value throughout the cutting stroke and until the knife has cleared the pile of material on its return stroke.

For this purpose a heavy spring 70 is mounted in the lower part of the frame through which passes a rod 71, and suitably supported by means of a fixed bracket 72, the spring working against such bracket at one end. At its other end the spring engages a collar 73 which is slidable along rod 71 and which carries a cross pin 74 having engagement in a notch in lever arm 75. Arm 75 is bifurcated and is freely rotatably mounted on shaft 38 receiving the right-hand bell crank 54 between its two arms, and is provided with a laterally projecting side arm 76 which overlies rock arm 37. Arm 37 is provided with a pressure pad 77 and is adapted to engage side arm 76 when the arm 37 is rocked into the upper end of its path of travel, the action of the spring 70 normally being to retain the side arm 76 in contact with the pressure pad 77.

The lower end of bifurcated lever 75 is provided with a pressure pad 80 which extends into the path of movement of the lower end of the bell crank 54, movement of lever 75 in a counter-clockwise direction therefore carrying bell crank 54 with it and producing a direct downward movement of the clamp.

In the operation of the device as thus constructed, the parts are shown in Fig. 2 in the relation in which they occupy at the end of a stroke, and in position to begin a subsequent cutting stroke. As shown the pitman 36 is practically on the center line between the crank 35 and the connecting pin 39. Thus although spring 70 is tending to move lever 75 counter-clockwise, and that pressure is applied through the side arm 76 to pressure pad 77 of rock arm 37, it has substantially no effect with respect to tending to cause movement of the crank, and the drive mechanism is held in stationary condition by the action of the brake above referred to. The parts in this position are thus stable and stationary, and in the absence of actuation of foot treadle 62, spring 58 retains the clamp 18 in its upper withdrawn position where it projects downwardly a short distance below the edge of the knife.

As the working stroke of the machine begins, the crank rotates in the direction of the arrow or counter-clockwise, with the result that the knife moves downwardly under the action of its connecting rods by the force thus imparted. At the same time, pressure pad 80 on lever 75 engages the lower end of bell crank 54, and thus effects concurrent rotation of the bell crank and pull rod assembly, overcoming the relatively small force of spring 58 and thus moving the clamp simultaneously downward along with the knife.

As the clamp engages the top of the pile, its further movement is arrested, and consequently further rotation of lever 75 is thereby terminated. When this occurs the rock arm 37 is free to continue its downward path of movement under the action of crank 35 thus continuing the downward stroke of the knife, while leaving the force of lever 75 applied entirely through pressure pad 80 to the clamp assembly.

It will thus be clear that even before the knife has progressed far enough to engage the top of the pile, the full effect of spring 70 is transmitted to the clamp, so that the full desired predetermined pressure is exerted upon the top of the pile even before any contact of the knife with the pile has taken place. As the motion of the crank 35 continues, the knife will be then pulled down through the pile to cut the same, but there is no delay in establishing the desired clamping pressure, and no additional load is imposed upon the drive connections during the time that the load on the knife itself is at a maximum.

As the cutting stroke is completed and the knife returns on its up stroke, it will pass above the upper level of the pile and the clamp before pressure pad 77 is rocked back far enough to engage arm 76, thus assuring that the knife has cleared the pile before the full predetermined pressure is released. Thereupon, during the latter part of its working stroke, rock arm 37 picks up lever 75 and rotates it in a clockwise direction, against the compressive action of spring 70 and hence a load is applied to the drive means in connection with removal of the clamp pressure but only at a time when the total load is at a small value and the addition of this particular load can have no effect so far as the cutting stroke of the knife is concerned.

It is likewise found desirable in many cases to provide for readily changing the force with which the clamp is urged toward the work material, and to vary such force over relatively wide limits. For this purpose it is preferred to provide more than one pressure spring, a second spring being shown at 81 on rod 82, arranged parallel with spring 70, and likewise provided with a pin 83 and collar 84 for engaging lever 75. Each rod is provided with a notch one of which is shown at 86 and a sleeve 87 is adapted to be engaged over the end of the respective rods to bear against the end of the collars 73 and 84, respectively. Sleeve 87 carries an arm 88 adapted to seat in notch 86, and to be removably held therein by means of a snap clip 89. Rollers 75a are carried by lever 75 adjacent the lower surfaces of sleeves 87 respectively to provide for supporting the respective right-hand ends of the spring assemblies when the sleeves are in place. Springs 70 and 81 as well as 58 are located in the same vertical plane, that plane including also the connections for actuating the clamp, so that there are no side forces to produce lateral displacement of the clamp. Further the plane in which the clamp mechanism is located is adjacent and preferably parallel with that in which the knife and its actuating mechanism are located, a compact arrangement being thus secured and the operating forces being kept in the respective vertical planes avoiding the creation of lateral forces.

As a result of this construction, either or both of the springs 70 and 81 can be quickly rendered effective or ineffective as desired, at the end of any stroke of movement. As shown in Fig. 2, spring 70 only is effective upon the clamp. Thus at the end of the stroke with the parts in the position shown in Fig. 2, lever 75 has been forced to such position that spring 81 is compressed, and is not in engagement with the end of sleeve 87, a clearance being indicated in the drawings to show this relationship. Under these conditions, the clip 89 can be removed and arm 88 then lifted, and sleeve 87 removed from the end of rod 82. Thereafter in the next stroke of operating movement, spring 81 will continue to expand and apply its force to lever 75 throughout the entire stroke, such force and the force of spring 70 being then additive. However, with the sleeve 87 locked in place as actually shown in Fig. 2, collar 83 can be moved by spring 81 only against sleeve 87, but is thereafter ineffective upon lever 75, spring 70 alone being effective to apply pressure to the clamp. By suitably selecting the force of the two springs, such as for example one developing a force of 2000 pounds and the other a force of 4000 pounds, it is obvious that through the arrangement described a force can be selected for application to the clamp of zero, 2000, 4000 or 6000 pounds. It will be understood that these figures are given as illustrative only, and further that one, two or more of such spring arrangements can be utilized as desired. Removal of panel 12 provides direct and easy access for effecting any change in the arrangement of sleeves 87 as may be desired.

In order to assure against any undesired, unexpected reverse movement of the knife such as might permit the dropping of the knife downwardly toward the cutting table, means are included for checking any reverse travel immediately that such movement begins to take place. As shown in Fig. 5, adjacent the periphery of bull gear 32 a pivot pin 90 is secured in the frame and on this pin is mounted a blocking arm 91 having a nose piece 91a adapted to engage in the teeth of the bull gear to positively prevent rotation thereof. To control the action of the blocking arm, a friction plate 92 is secured to the end of the arm and adapted to bear against the side of gear wheel 32 so that in response to normal forward movement of the gear, the friction tends to lift the nose piece out of blocking engagement, rotating movement of the blocking arm being limited by stop pin 93. However, upon incipient reverse travel of the bull gear, the friction on plate 92 tends to pull it in the opposite direction, thereby causing nose piece 91a to engage in the gear teeth 32, this being the position illustrated in Fig. 5. As a result any tendency toward reverse movement is immediately stopped and positive assurance against such undesired movement is thereby provided.

Because the knife is subject to substantial wear and must be sharpened, its position with respect to the table must be adjustable and in accordance with the present invention provision is made for readily adjusting both the elevation of the knife with respect to the cutting table, and for assuring that the knife occupies a desired level position at the bottom of its stroke. For this purpose, adjustable eccentric connections are provided at either end of the knife bar, the construction and operation of which will now be described.

Referring to Figs. 6, 7 and 8, Figs. 6 and 7 show the construction of the eccentric at the right-hand end of the knife bar, i. e., the end to which connecting rod 40 is secured. As there shown, connecting rod 40 rides on a bearing 93 which is carried by an eccentric block 94, the eccentric being rotatable with respect to the knife bar 15. A stud 95 is threaded into the block 94 and pinned thereto by means of cross pin 96, the head of the stud having flat faces thereon providing for the attachment of a wrench for the purpose of turning the eccentric block in the knife bar. A front plate 97 is pinned to the eccentric block by means of pin 98 so that the plate rotates with the block, the plate being provided with an outer concentric slot 99. A bolt 100 is secured in knife bar 15 and extends outwardly through the slot 99 providing for limiting the extent of rotation of the eccentric assembly to approximately 180° and for securing the eccentric in any desired position of adjustment.

The eccentric 94 is also provided with a rearwardly extending nose piece 102 which is received within the slide block 42 the latter being guided in the stationary guides 44. It will be clear from the above that as a result of the rotation of the eccentric block, the position of the knife bar 15 with respect to the connecting rod 40 will be changed, and the knife bar will be similarly shifted upwardly or downwardly with respect to the guide block 42. This has the effect of raising or lowering the entire knife bar, since it is obvious that any raising or lowering of the right-hand end of the bar requires a corresponding travel of the free opposite end, thus adjusting the level of the knife and knife bar but without changing the angularity thereof.

At the opposite end of the knife bar 15 is located a similar eccentric 105 which likewise receives a stud 106 which is pinned thereto by means of cross pin 107 and which has adjusting head 108. A face plate 109 is pinned to the eccentric by pin 110 and is formed with a similar slot 111 through which extends the fastening bolt 112 by means of which the eccentric can be held in any desired position of adjustment. The rear nose section 114 extends through guide 46 which guide block is supported in the stationary guide 47.

In response to rotation of the eccentric at the left-hand end it will be clear that the effect is analogous to changing the length of the knife bar between its points of connection and because the right-hand end is fixed by reason of guide 44 and rod 40, this results in a change in the angle of inclination at which the knife bar is supported in the fixed guides. Access to the eccentric is provided through removable cover plates 13 located at their end of the machine and it will be clear that by suitably adjusting first one and then the other eccentric, the knife and knife bar may readily be made to occupy a desired level and in predetermined parallel relation with the cutting table as desired.

Fig. 9 shows the arrangement of the knife at the bottom of its stroke, the cutting table being shown at 10, and having a groove therein for receiving the cutting strip 118, which is preferably a strip of hard wood having its top surface level with the cutting table and with the bottom edge of the knife just contacting the strip in the lowermost position of its travel. It is desirable to avoid contact of the sheets of material which have been severed with any projected portions of the knife supporting assembly, since to do so may cut or damage the edges of the material or interfere with the free movement of the knife. It is, however, necessary to provide for adjustably positioning the knife in the knife bar and to make provision for wear of the knife and the shortening of the length of the blade thereof in the cutting direction while at the same time providing for adequately securing the knife in its assembled position.

It is found, for example, that the angle of bevel of the knife, indicated in Fig. 9, is relatively limited, that is, that it must fall within quite narrow limits in order to provide for the most effective cutting action without producing excessive drag. Thus a suitable angle for this purpose has been found to be approximately 26°.

In accordance with the present invention a novel construction is provided for removably securing the knife upon the knife bar through the provision of a securing means which does not extend above the projection of the bevel of the knife and hence is out of the path traversed by the sheets of material as they are cut. In Fig. 9 the path of movement of the cut sheets is clearly indicated, the beveled face 120 of the knife performing the entire work of shifting the pile progressively forward as it advances downwardly. It is desirable that such work be accomplished through the knife bevel and not by contact of the sheets of material with the knife bar itself.

For this purpose the knife bar 15 is provided on its forward face with a series of recesses 121 which are apertured as shown at 122 to receive bolts 123 therein. On the rear side, the knife bar has a groove 125 and a shouldered part 126 against which the upper edge of the knife is adapted to bear in order to absorb the thrust of the knife. As the knife wears, an auxiliary thrust block 127 may be interposed in this groove between the knife and shoulder 126.

The knife is provided with a series of apertures at different levels, each of which is threaded and one group of which is adapted to receive the bolts 123 to hold the knife in place in the groove. A washer 128 is seated under the bolt head, the entire bolt head being relatively shallow in depth so that at no point does it project outwardly beyond the projection of the bevel of the knife, and hence lies inwardly of the stack of sheet material which follows along this projected bevel line. In order to provide for properly securing the bolt in place, the usual provision of a bolt head has been found to give insufficient gripping area for tightening the bolt, and the head is accordingly provided with axially extending serrations 129 around the periphery thereof. Thus by the application of a suitable wrench to the serrated surface, adequate force may be developed upon the bolt to fasten and secure the knife in place, while the bolt itself and other parts of the knife bar assembly are maintained inwardly of the line of contact with the pile.

Back gage 22 is adjustable toward and away from the knife for the purpose of varying the depth of cut, and it is important to provide for adjustment of the positioning of the back gage by control means which is located in a readily accessible position at the operator's end of the machine, while at the same time assuring that the back gage will be securely held in predetermined adjusted position, resisting any tendency to move as the pile of sheet material is placed thereagainst or removed therefrom. It is important to maintain this position of the back gage with a high degree of accuracy, and to provide a releasable clamp or holding means therefor which does not have loose play or permit shifting of the gage after it has been set.

The construction which provides for this control of the position of the back gage is shown in Figs. 11 to 13 in which the gage 22 is shown as being movable across the upper face of the cutting table 10. Such movement is produced by means of a flexible connecting means 140 which preferably takes the form of a sprocket chain, trained around a rear sprocket 141 and around a forward sprocket 142. The forward sprocket is connected to be rotated with the hand wheel 143 which is positioned directly below the cutting table 10 and the outer periphery of which extends forwardly beyond the edge of the table.

The forward sprocket and the hand wheel 143 are rotatably supported in a bracket 144 fastened to the under side of the table. It is thus clear that upon rotation of member 143 the sprocket chain causes the gage to shift laterally, the gage being maintained in proper parallel alignment by means of a central web traveling in guide slot 145.

For the purpose of clamping the gage member in predetermined position, a fixed friction block 146 is positioned adjacent one side of the flexible chain 140 and a cooperating friction block 147 is located on the opposite side thereof. An eccentric shaft 148 is received within cooperating recesses in the block 147 and cap 149 which is bolted thereto by means of bolts 150, shaft 148 having a lower extending part to which a gripping handle 151 is secured. As a result of the turning of handle 151, the eccentric shaft supported in bracket 144 causes the adjustable friction element 147 to be pressed into gripping engagement with the sprocket chain which is gripped between blocks 146 and 147. This provides a secure lock for holding the chain and through it the gage in predetermined fixed position. When resetting of the back gage is desired, handle 151 is turned to free the sprocket chain which may then be adjusted through hand wheel 143, and readily and securely relocked in its adjusted position.

In some cases it is desirable to provide a slight angle of tilt between the upright face of the back gage and the plane perpendicular to the cutting table. To provide for such adjustment toward and away from the vertical, the back gage 22 is fitted with rollers 155 at its rearmost point, these rollers being adapted to travel over the surface of the cutting table to support the rear end of the gage. Each roller is mounted on an eccentric shaft 156 which carries an adjusting head 157 having suitable index marks thereon to provide for the turning of the eccentric and the setting of the position thereof to a desired point on either side of the gage and to thus afford proper and even lift of the rear end of the gage to establish the inclination as desired.

In the operation of the cutting machine as herein described it is necessary for the operator to reach under the raised cutting knife in order to position and remove the work material upon the cutting table. It is therefore desirable to provide an effective interlocking construction which assures against repeat operations of the cutting mechanism, or against any undesired or unexpected travel of the knife. A control is preferably provided which requires the use of both hands of the operator in order to start the operation of the mechanism. There is further provided an interlocking arrangement which necessitates a definite or predetermined sequence of movements on the part of the operator, thus overcoming any possibility of the mechanism being tripped and placed in operation by accidental contact with the controls or by any unexpected movement other than a definite operating sequence performed by the operator.

In order to provide a positive stop for the knife, a safety bolt 160 is carried by the frame 34, being formed with a shaft portion 161 extending through an aperture suitably formed to support the bolt, and also carrying a guide pin 162 similarly extending into an aperture in the frame to prevent undesired rotation of the safety bolt. As shown in Figs. 17 and 18, the safety bolt has a flanged forward face 163 which in its operative or blocking position projects directly into the path of travel of the crank 35, and when in this position will positively stop movement of the crank during the initial part of its working stroke and thus assure against having the knife drop while the operator's hands are within range. Preferably a frangible safety ring is provided in the drive mechanism for the crank at a suitable point so that when the crank strikes this safety bolt, the safety ring will rupture without producing any damage to the mechanical parts of the device. A preferred construction for such shear pin is shown in co-pending application Serial No. 392,592 assigned to the same assignee as this application. Frame 34 is provided with a recess 164 into which the face 163 of the safety bolt 160 is adapted to seat, thereby occupying a clearance or non-interfering position with respect to the crank 35.

In order to control the operation of the machine, a pair of handles 166 and 167 are provided, the use of the left-hand control 166 being optional, but being preferred in order to require a definite positioning of both hands of the operator before the machine can be tripped. Handle 166 is suitably associated with the control of the clutch so that where its use is desired, it is necessary to depress or move that handle before actuation of the clutch can take place. The details of such mechanism need not be further shown in this application.

Handle 167 is mounted for pivotal movement in a substantially vertical plane about clutch control shaft 28. As will be clear from the showing in Figs. 16 and 17 shaft 28 carries a clamping collar 168 which has a depending lever portion 170 above which is supported an extending arm 171. Such arm also carries a vertically extending pivot pin 173 and lever 167 is mounted on this pivot pin providing for displacement or movement thereof in a substantially horizontal plane. Thus the entire lever and lower projecting arm assembly may rotate about the horizontal axis of clutch shaft 28, and in addition the lever itself is rotatable about the vertical axis of pin 173.

Means are provided for preventing initial direct downward movement of lever 167 such as to cause rotation of clutch shaft 28. This means comprises a detent 175 which is mounted in a suitable guide 176 carried by the frame of the machine and yieldably urged by spring 177 to position directly below the arm of lever 167. The detent has a flat upper face and a beveled lower face 178. The arm 171 is formed with an upwardly extending end section 180 in which there is located a spring 181 which tends to normally urge the operating end of lever 167 toward the notched face of the detent, so that it is prevented thereby from moving downwardly.

The opposite end 183 of lever 167 is adapted to engage a sliding yoke 185 which is suitably carried by frame 34 and with which a resilient member 186 is associated to normally urge said yoke against the operating end 183 of the lever. The yoke 185 is substantially U-shaped and has on one arm a sloping cam face 185a adapted to cooperate with the end 183 of the lever, and on its other arm is provided with a blocking or latching nose part 187. This latch 187 is directly in line with the flange 163 of the safety bolt assembly, such flange having sufficient width axially of the bolt, as shown in Fig. 17, to permit the latch element 187 to ride thereon when the safety bolt is withdrawn to its non-interfering position. When the bolt is moved outwardly to its blocking or interfering position, however, spring 186 snaps the yoke and the latching part 187 behind the flange 163 so that, as shown in Fig. 18, the bolt is then locked in its interfering position and cannot be moved axially until the latch has been withdrawn.

In order to provide for shifting of the safety bolt from one position to another, a cam surface 190 is formed upon the side face of bull gear 32, this cam surface cooperating with the end of the shaft 161 to move the safety bolt into a blocking position. The location of the cam is such that this movement takes place at substantially the end of the operating cycle of the machine, so that when such cycle is completed, the safety bolt has been positively advanced to an interference position which it retains in the absence of further actuation of the control mechanism.

Return movement of the safety bolt to a clearance position is effected by downward movement of the control lever 167, which carries a sleeve 192 at the lower end of lever 170, said sleeve being received over an operating pin 193 which fits into a cupped recess 194 in the forward face of the safety bolt. For normal operation, the sleeve 192 is locked in direct operative relation with rod 193 by means of an auxiliary locking lever 195 having a nose piece 196 which fits into cooperating notches 197 formed in the sleeve and rod respectively. A spring 198 is received within the sleeve and bears against the end of rod 193, such spring being normally ineffective during the time that the sleeve and the rod 193 are secured together by locking pin 196. However, if lever 195 is actuated to disconnect the sleeve and the rod 193, it is then possible to depress operating control lever 167 without actuating the safety bolt away from its interfering position. The nose 196 of lever 195 is normally urged upwardly to be maintained in locking position by leaf spring 199.

The operation of this control is as follows: At the end of each operating stroke and prior to the actuation of the controls for a succeeding cycle of operation, the safety bolt has been moved to interfering position substantially as shown in Fig. 17. In such position further downward travel of the knife is positively blocked. The operator then grasps handle 167 and since direct downward movement thereof is prevented by detent 175, the only movement possible is a lateral movement about the vertical axis 173. Under such movement, the operating end 183 engages yoke 185 and withdraws it from latching position in back of flange 163, thus shifting it from the position shown in Fig. 18 to the position shown in Fig. 19. Thereafter the handle 167 can be actuated downward and in so doing rotation is imparted to shaft 28 which effects the operation of the clutch to engage the same and start rotation of the bull gear 32 and the crank 35. At the same time, if the auxiliary handle 166 is provided, it is also actuated to position to release shaft 28 and thereby provide for such actuation of the clutch.

Simultaneously with the downward movement of handle 167, sleeve 192 moves forwardly and pin 193 engages in the cup 194 to move safety bolt 160 out of its interfering position and into recess 164 so that it is in a clearance position which permits crank 35 to pass across the same. At this point the operator releases the handle 167, which is then shifted about the axis 173 under the action of spring 181, but it still remains depressed. During the running cycle of the machine, the yoke 185 then bears against the flange 163, the safety bolt remaining in a clearance position.

Toward the end of the working cycle, cam 190 effects shifting of safety bolt 161, restoring the same to its interfering position, and concurrently therewith rocking the sleeve 192 and lever 170 as well as control arm 167 about the axis of clutch shaft 28. The clutch is thus actuated to disengaged position, cutting off the source of driving power, suitable brake means being concurrently actuated to stop the operation and hold the machine against drifting. As the lever 167 is thus raised from its depressed to its upper position, it rides against the cam face 178 of the detent 175, latching over the same when it is finally entirely lifted so that it then occupies the initial position in preparation for a subsequent operating cycle. Thus undesired or accidental bumping or shifting of the control handle 167 is rendered ineffective with respect to tripping the machine, and an operating cycle of the machine can take place only upon a predetermined definite sequence of operations on the part of the operator. Further a safety bolt is provided in the direct drive connection so that unless this operation is performed in the desired manner, unexpected or undesired movement of the knife is positively prevented.

On occasion it may be desirable to provide for the closing of the clutch while the safety bolt is still in interfering position, such as to provide for the jogging of the mechanism in a limited travel before actual contact of the crank and the safety bolt occurs. Under these circumstances handle 195 is raised against the action of spring 199 to disconnect the operating connection between the sleeve 192 and the rod 193 whereupon with the safety bolt in the position shown in Fig. 17, handle 167 may be depressed through the compression of spring 198. Since this is a special operation which requires the operator to perform a separate step in the actuation of control handle 195, not only are his hands occupied, but the difference in the operation of the normal control handle 167, which is now required to overcome the force of spring 198 before the clutch can be closed, is sufficient and adequate to warn him not to allow his hand to come in the path of the knife. Thus the complete safety protection of the machine against injury is maintained in this condition as well as in normal operating condition.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A cutting machine of the character described comprising a cutting table adapted to support the work material to be cut, a knife, a driving member, means for engaging said driving member and said knife to actuate said knife with a reciprocating movement to effect a cutting stroke thereof with respect to the work material on said table, clamp means for applying a predetermined pressure to the work material during the cutting stroke of said knife, means for moving said clamp means into contact with said work material before the knife contacts the work on its cutting stroke and for retaining said clamp in contact therewith until after said knife has left the material on its return stroke, means for applying full predetermined pressure to said clamp means throughout its contact with the work, and means for selectively disabling said pressure applying means to render said means ineffective for applying pressure to said clamp means on subsequent working strokes.

2. A cutting machine of the character described comprising a cutting table adapted to support the work material to be cut, a knife, a driving member, means for engaging said driving member and said knife to actuate said knife with a reciprocating movement to effect a cutting stroke thereof with respect to the work material on said table, clamp means for applying a predetermined pressure to the work material during the cutting stroke of said knife, means for moving said clamp means into contact with said work material before the knife contacts the work on its cutting stroke and for retaining said clamp in contact therewith until after said knife has left the material on its return stroke, means for applying full predetermined pressure to said clamp means throughout its contact with the work, means actuated from said driving member during the return stroke for withdrawing the action of said pressure applying means, and means operable at the end of any working stroke for selectively disabling said pressure applying means to render said means ineffective for applying pressure to said clamp means on subsequent working strokes.

3. A cutting machine of the character described comprising a cutting table adapted to support the work material to be cut, a knife, a driving member, means for engaging said driving member and said knife to actuate said knife with a reciprocating movement over a working stroke to effect the cutting of the work material on said table, clamp means for applying pressure to the work material to be cut during the cutting operation of said knife, compressible means for storing energy, means connecting said compressible means with said clamp means to provide for applying a holding pressure to said pile on the cutting stroke of said knife, and means operable at the end of the working stroke for rendering said compressible means ineffective to apply pressure to said clamp means and for connecting said compressible means with said driving member for restoring the energy thereof.

4. A cutting machine comprising a cutting table adapted to receive a pile of work material to be cut, a reciprocable knife operable through a working stroke for cutting said pile of material on said table, drive means for reciprocating said knife, a clamp for applying a clamping pressure to said pile of material during the cutting stroke, a plurality of resilient means tending to urge said clamp into clamping relation with said pile, means actuated from said drive means during the return stroke of the knife for rendering said resilient means ineffective with respect to said clamp means and for restoring the effectiveness thereof upon the subsequent forward stroke of the knife, and means operable between working strokes for selectively retaining one or more of said resilient means in said ineffective condition upon subsequent working strokes.

5. A cutting machine comprising a cutting table adapted to receive a pile of work material to be cut, a reciprocable knife operable through a working stroke for cutting said pile of material on said table, drive means for reciprocating said knife, a clamp for applying a clamping pressure to said pile of material during the forward cutting stroke, counterbalancing means for effecting the raising of said clamp above said table, resilient means adapted to overcome said counterbalancing means and to urge said clamp into said clamping relation, means actuated from said drive means during the return stroke of the knife for compressing said resilient means to render said resilient means ineffective with respect to said clamp and for restoring the effectiveness thereof upon the subsequent forward stroke of the knife, and selectively operable means for locking said resilient means in compressed position to render said means ineffective to actuate said clamp means upon subsequent working strokes.

6. A cutting machine comprising a cutting table adapted to receive a pile of work material to be cut, a reciprocable knife operable through a working stroke for cutting said pile of material on said table, drive means for reciprocating said knife, a clamp for applying a clamping pressure to said pile of material during the forward cutting stroke, a plurality of resilient members adapted to apply different clamping pressures to said clamp, means actuated from said drive means during the return stroke of the knife for rendering said resilient means ineffective with respect to said clamp means and for restoring the effectiveness thereof upon the subsequent forward stroke of the knife, and means for selectively locking each of said resilient members in compressed position to render a locked member ineffective upon said clamp means upon subsequent working strokes and thereby predetermine the pressure applied to said clamp means.

7. A cutting machine of the character described comprising a cutting table adapted to receive a pile of work material to be cut, a reciprocable knife operable through a working stroke for cutting said material on said table, means for reciprocating said knife, a clamp for applying a clamping pressure to said pile of material during the cutting stroke, resilient means tending to urge said clamp into clamping relation with said pile, means for locking said resilient means in compressed position to render the same ineffective upon said clamp means, and means operated by said drive means during each working stroke thereof for placing said resilient means in compressed condition providing for selective actuation of the locking means associated therewith.

8. A cutting machine of the character described comprising a cutting table adapted to receive a pile of work material to be cut, a reciprocable knife operable through a working stroke for cutting said material on said table, means for reciprocating said knife, a clamp for applying a clamping pressure to said pile of material during the cutting stroke, a plurality of resilient means tending to urge said clamp into clamping relation with said pile, means for locking said resilient means in compressed position to render the same ineffective upon said clamp means, and means operated by said drive means during each working stroke thereof for placing said resilient means in compressed condition providing for selective actuation of the locking means associated with each of said resilient means to predetermine the pressure applied to said pile therewith.

9. A cutting machine of the character described comprising a cutting table adapted to receive a pile of work material to be cut, a reciprocable knife operable through a working stroke for cutting said material on said table, means in the plane of said knife for reciprocating said knife, a clamp for applying a clamping pressure to said pile of material during the cutting stroke, a plurality of resilient means tending to urge said clamp into clamping relation with said pile, said resilient means and said clamp means being located in a common plane adjacent and generally parallel with that of said knife, means for locking said resilient means in compressed position to render the same ineffective upon said clamp means, and means operated by said drive means during each working stroke thereof for placing said resilient means in compressed condition providing for selective actuation of the locking means associated with each of said resilient means to predetermine the pressure applied to said pile therewith.

10. A cutting machine comprising a cutting table adapted to receive a pile of work material thereon, a reciprocable knife, drive means for actuating said knife in a working stroke to cut the material on said table, an inclined guide adjacent each end of said knife for causing the respective ends thereof to travel in predetermined paths during said reciprocating movement, a connecting rod secured to one end of said knife means for effecting actuation thereof, an adjustable eccentric connection between said connecting rod and said knife providing for adjusting the level of said knife with respect to said cutting table at the bottom of its stroke of movement, an adjustable eccentric between the other end of said knife and its associated guide for adjusting the angle which the knife means makes with said cutting table, and means on each eccentric connection for effecting adjustment thereof and for retaining the same in predetermined adjusted position.

11. A cutting machine of the character described comprising a cutting table adapted to receive a pile of work material to be cut, a reciprocable knife, a rotating drive gear, a crank operated by said drive gear for causing reciprocating movement of said knife, a blocking member for preventing reverse rotation of said drive gear and said knife, said blocking member having a part adapted to engage in the teeth of said gear to stop rotation thereof, pivotal means for mounting said blocking member providing for movement thereof from its said blocking position to a clearance position out of contact with said gear teeth, and a friction plate secured to said member adapted to frictionally bear against the side of said gear to retain said member in clearance position during forward rotation of said gear and to effect movement thereof into blocking position upon initial reverse rotation thereof.

12. A cutting machine comprising a cutting table adapted to support a pile of work material thereon, a reciprocable knife for cutting said material, a back gage in the rear of said knife for determining the spacing of the material with respect to the knife, a control member located at the front of the machine and accessible to the operator for effecting adjustment of said back gage, flexible connecting means extending from said control member to said back gage to control and determine the spacing thereof, and a releasable clamp frictionally engaging said flexible means for retaining said back gage in a predetermined adjusted position.

13. A cutting machine comprising a cutting table adapted to support a pile of work material thereon, a reciprocable knife for cutting said material, a back gage in the rear of said knife for determining the spacing of the material with respect to the knife, a control member located at the front of the machine and accessible to the operator for effecting adjustment of said back gage, flexible connecting means extending from said control member to said back gage to control and determine the spacing thereof, a friction block for gripping said flexible connecting means, and a manually operated lever having an eccentric part for forcing said block into gripping engagement with said flexible means.

14. A cutting machine comprising a cutting table adapted to support a pile of work material thereon, a reciprocable knife for cutting said material, a back gage in the rear of said knife for determining the spacing of the material with respect to the knife, a control member located at the front of the machine and accessible to the operator for effecting adjustment of said back gage, flexible connecting means extending from said control member to said back gage to control and determine the spacing thereof, rollers carried by said back gage spaced rearwardly of the gaging face thereof for supporting the rear of said gaging member from said cutting table as said gage in moved to different spacing positions, and adjustable eccentrics for mounting said rollers in said gage providing for adjusting and predetermining the angle of tilt of the face of said gage with respect to said table.

15. A cutting machine comprising a cutting table adapted to receive a pile of work material thereon, a reciprocable knife, drive means for actuating said knife in a working stroke to cut the material on said table, an inclined guide adjacent each end of said knife for causing the respective ends thereof to travel in predetermined paths during said reciprocating movement, a connecting rod secured to one end of said knife means for effecting actuation thereof, an adjustable eccentric connection between said connecting rod and said knife means providing for adjusting the level of said knife with respect to said cutting table at the bottom of its stroke of movement, and an adjustable eccentric between the other end of said knife means and its associated guide means for adjusting the angle which the knife means makes with said cutting table in any part of its working stroke.

16. A cutting machine comprising a cutting table adapted to receive a pile of work material to be cut, drive means, a reciprocable knife for cutting the work material on said table, a crank connected to said knife and operated from said drive means for causing reciprocation thereof, a safety bolt movable into the path of said crank for positively stopping the travel thereof and preventing further movement of said knife, means operated by said drive means toward the end of said reciprocating movement for moving said safety bolt into the path of said crank to prevent undesired repeat operation thereof, latch means movable into a latching position for preventing withdrawal of said bolt from its said interfering position, a manually operable control lever, means actuated by movement of said control lever in one direction for effecting withdrawal of said latch means, and means operable upon movement of said control in a different direction for moving said safety bolt out of the path of said crank, and means preventing movement of said control means in said second mentioned direction until after it has been moved in said first mentioned direction.

17. A cutting machine comprising a cutting table adapted to receive a pile of work material to be cut, drive means, a reciprocable knife for cutting the work material on said table, a crank connected to said knife for causing reciprocation thereof, a clutch for connecting and disconnecting said drive means and said crank, a safety bolt movable into the path of said crank for positively stopping the travel thereof and preventing further movement of said knife, latch means movable into a latching position for preventing withdrawal of said bolt from its said interfering position, a manually operable control lever adapted to effect engagement of said clutch, means actuated by movement of said control lever in one direction for withdrawing said latch means, means operable upon movement of said control lever in another direction for effecting engagement of said clutch and for moving said safety bolt out of the path of said crank, means for preventing movement of said lever to cause clutch engagement until after it has been moved to effect release of said latch, and means operated by said drive means toward the end of the stroke of said knife for moving said safety bolt into interfering relation with said crank and for simultaneously restoring said control lever to its neutral position where said clutch is disengaged.

18. A cutting machine comprising a cutting table adapted to receive a pile of work material to be cut, drive means, a reciprocable knife for cutting the work material on said table, a crank connected to said knife for causing reciprocation thereof, a clutch for connecting and disconnecting said drive means and said crank, a safety bolt movable into the path of said crank for positively stopping the travel thereof and preventing further movement of said knife, latch means movable into a latching position for preventing withdrawal of said bolt from its said interfering position, a manually operable control lever adapted to effect engagement of said clutch, means actuated by movement of said control lever in one direction for withdrawing said latch means, means operable upon movement of said control lever in another direction for effecting engagement of said clutch and for moving said safety bolt out of the path of said crank, means for preventing movement of said lever to cause clutch engagement until after it has been moved to effect release of said latch, means operated by said drive means toward the end of the stroke of said knife for moving said safety bolt into interfering relation with said crank and for simultaneously restoring said control lever to its neutral position where said clutch is disengaged, and means interposing a yieldable connection between said clutch and said safety bolt providing for intentional actuation of said lever to cause engagement of said clutch with said safety bolt in interfering position.

WILLIAM R. SPILLER.
LEO D. BARLEY.